United States Patent [19]

Choi

[11] Patent Number: 5,038,850

[45] Date of Patent: Aug. 13, 1991

[54] COOLING AND HEAT ACCUMULATING TYPE ELECTRIC COOLING AND HEATING SYSTEM AND A METHOD FOR IMPLEMENTING THE SAME

[76] Inventor: Young T. Choi, 292-52, Imoon-Dong, Tongdaemoon-ku, Seoul, Rep. of Korea

[21] Appl. No.: 612,826

[22] Filed: Nov. 13, 1990

[30] Foreign Application Priority Data

Nov. 13, 1989 [KR] Rep. of Korea ............ 1989-16438

[51] Int. Cl.⁵ ..................................... F28D 20/00
[52] U.S. Cl. ............................... 165/10; 165/18; 165/104.11; 165/48.1; 237/19; 62/430
[58] Field of Search .......... 165/18, 48, 10, 104.11; 237/19; 62/430

[56] References Cited

U.S. PATENT DOCUMENTS

| | | | |
|---|---|---|---|
| 2,677,243 | 5/1954 | Telbes | 165/18 |
| 4,037,650 | 7/1977 | Randall | 165/18 |
| 4,114,600 | 9/1978 | Newton | 165/10 |
| 4,259,401 | 3/1981 | Chahvoudi | 165/10 |
| 4,471,834 | 9/1984 | Schlote | 165/10 |

Primary Examiner—Albert W. Davis, Jr.
Attorney, Agent, or Firm—Flynn, Thiel, Boutell & Tanis

[57] ABSTRACT

A cooling and heating system includes a heating chamber in which is disposed a heater element on the bottom of a cooling and heat accumulating chamber, multiple convection current suppression layers, and a cooling chamber in which is disposed a cooling coil on the top of the chamber to enable alternate circulation through the cooling and heat accumulating chamber, the cooling chamber being connected to air mixers which in turn communicate with feed and recovery ducts to thereby form a circulation circuit. By use of air flowing between the solid cooling and heat accumulating materials, cooling accumulation and cooling radiation or heat accumulation and heat radiation can be formed by downward cooling or upward heating through the cooling and heat accumulating chamber.

9 Claims, 6 Drawing Sheets

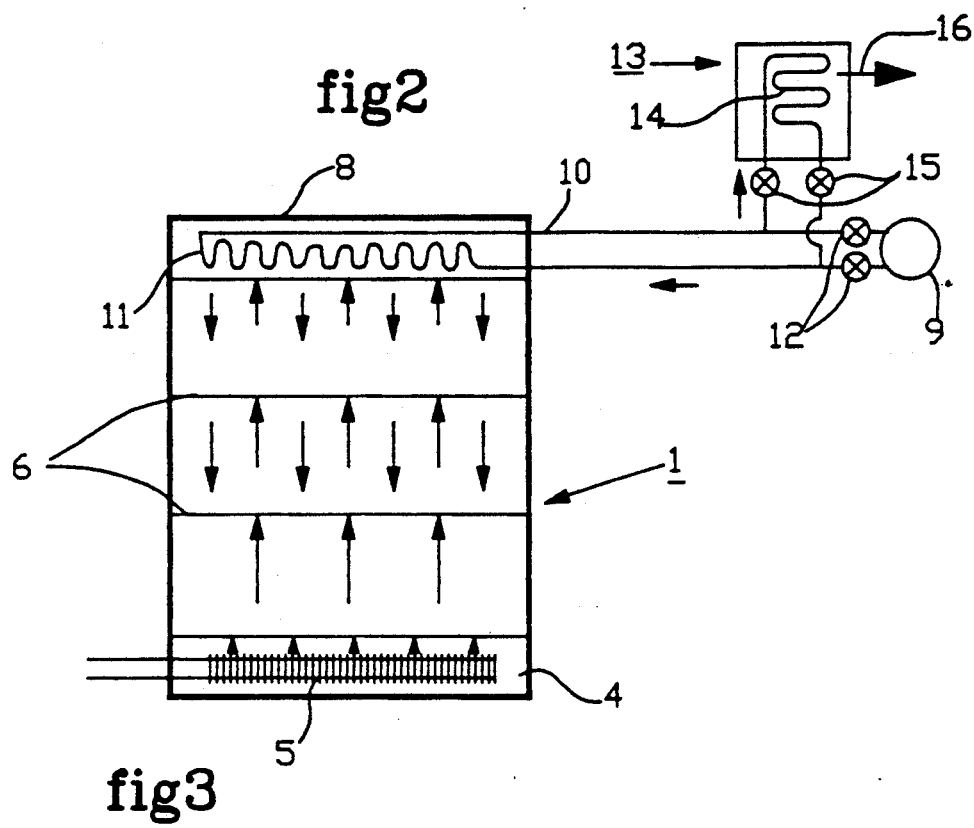
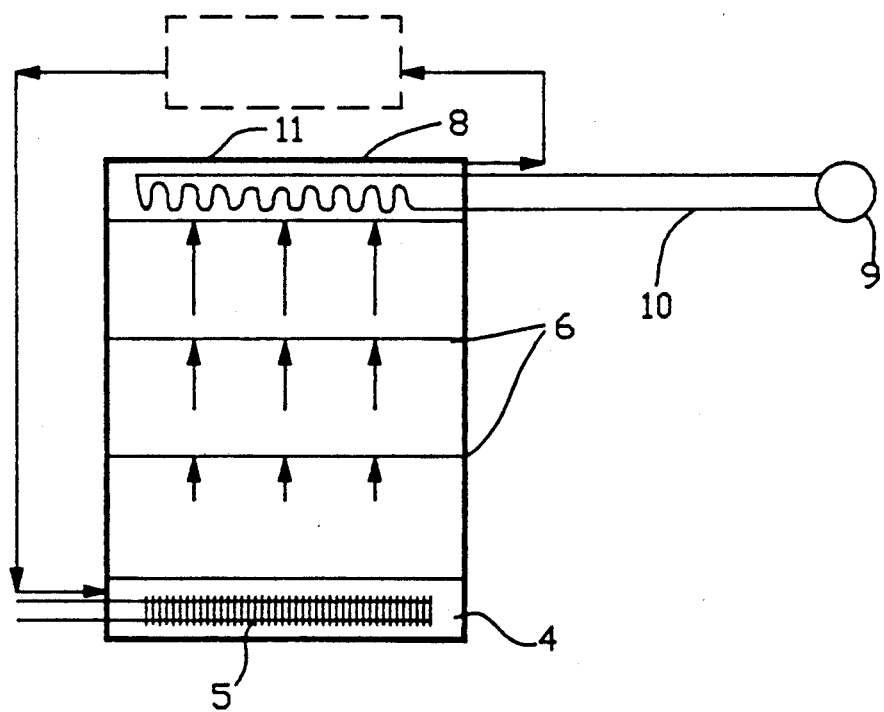

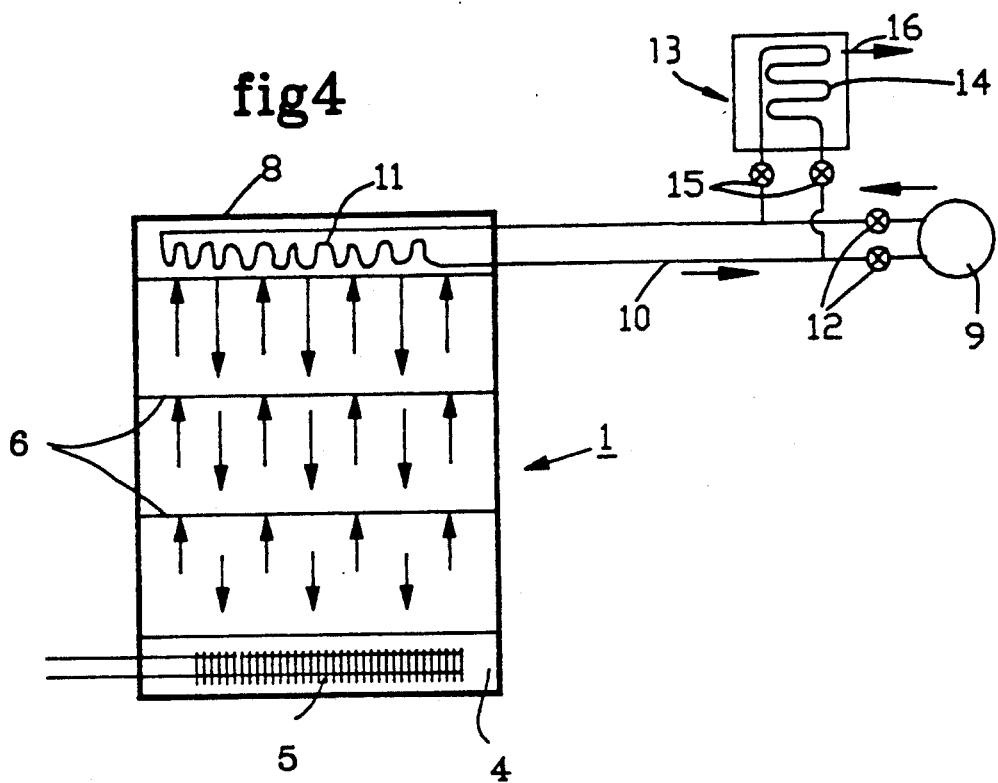
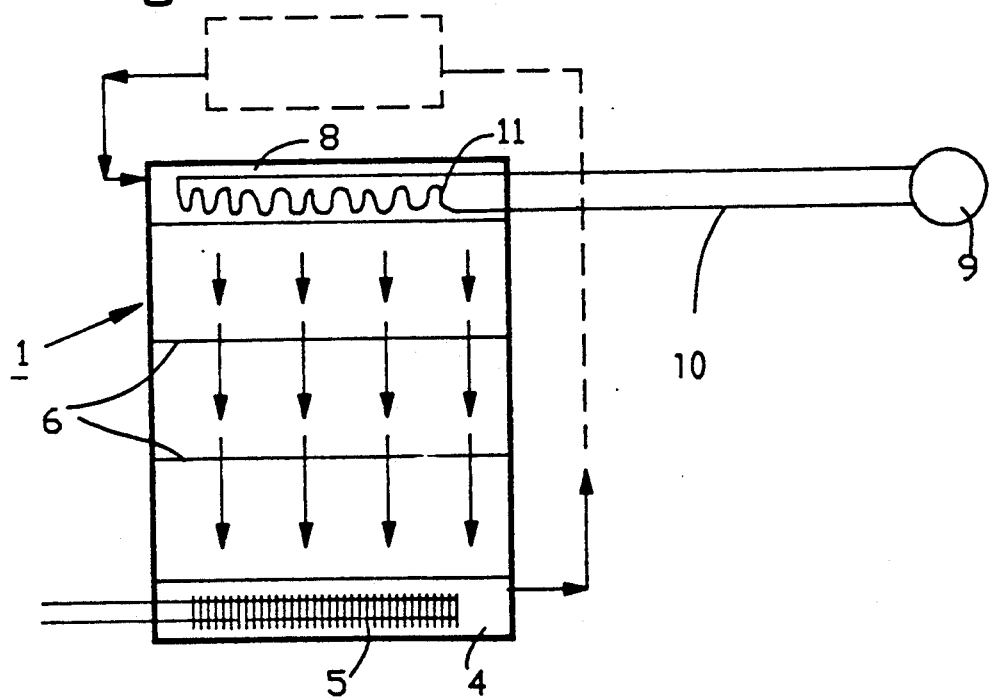

COOLING AND HEAT ACCUMULATING TYPE ELECTRIC COOLING AND HEATING SYSTEM AND A METHOD FOR IMPLEMENTING THE SAME

CROSS-REFERENCE TO RELATED APPLICATION

The subject matter disclosed in this application is related to the subject matter disclosed in my U.S. Pat. No. 4,896,831, issued on Jan. 30, 1990 (U.S. Ser. No. 07/220,001, filed July 15, 1988) and my U.S. Pat. No. 4,962,884, issued Oct. 16, 1990 (U.S. Ser. No. 07/400,555, filed Aug. 30, 1989), the disclosures of which are to be incorporated herein by reference.

FIELD OF THE INVENTION

This invention relates to a cooling and heat accumulating type electric cooling and heating system and a method for implementing the same.

BACKGROUND OF THE INVENTION

The existing and known methodology has heretofore heated water by the use of combustion heat from various combustible fuels and accumulated heat is delivered to the desired area by conveying and transferring heat with the water to effect a heating of the air within the designated area. When water is heated above 100° C., the water is changed into a vapor. Accordingly, water has the capability of accumulating heat, but various problems occur due to the high vapor pressure and, as a result, water is not deemed to have excellent heat accumulating capabilities. Further, when air in a given area is to be cooled, and when water in a freezer unit is used as a cooling medium, air in the room is cooled by the cooled water. However, when water reaches the freezing point (0° C.), freezing takes place in the pipes and water can no longer be circulated. Accordingly, since water may not be cooled below the freezing point, and since the ability of conveying the cooling medium is limited, much water is required for such systems. In addition, very high equipment costs are also required.

Water can be utilized only between the freezing point and the boiling point and without phase change, and is much limited in the cooling and heat accumulating aspects and is, therefore, not deemed suitable as a heat exchanging medium (cooling accumulating agent and heat accumulation agent).

Recently, in the advanced countries, cooling accumulation by freezing has been attempted. However, due to the shortage of cooling accumulating volume and cooling accumulating tanks, cooling accumulation by freezing is not suitable for cooling, and has been used only under the most extenuating circumstances.

When cooling and heating equipment is disposed within large and small-type buildings with separate heating systems, or in the case of heat pumps, dual pieces equipment is usually disposed with various associated facilities and this creates various expensive factors that must be taken into account, such as the life of the equipment, the expense of the equipment as well as the space occupied thereby and the cost of maintenance. Safety factors are also a consideration, such as the amount of pollution produced by the combustion of fuel, fires, explosions and leakage as well as the necessity of supplying and removing of waste as a result of combustion of the fuels.

Therefore, in the advanced countries, the study of methods of cooling and heating using electric power as a noncombustible heat source and particularly the study of methods of cooling and heat accumulating type cooling and heating systems using nighttime generated electric power have been attempted and developed. Due to the increased demand for electric power caused by the development of electric household devices as well as electrically operated devices within industry, use of nighttime generated electric power has become strongly desirable because it is at this time that excess and less expensive power is available. However, in order to use this power, it is necessary to accumulate either heat or coldness during the nighttime so that the accumulated energy can be utilized throughout the daylight hours without drawing significantly from the electrical power supply during the daylight hours.

Therefore, it is an object of the invention to provide a cooling and heat accumulating type electric cooling and heating system and a method for implementing the same to overcome the deficiencies of the known systems. The invention is designed to make possible cooling and heating as needed after accumulating nighttime energy into a solid cooling and heat accumulating material using nighttime generated electric power.

It is a further object of the invention to improve upon the cooling and heat accumulating effects by the use of solid cooling and heat accumulating materials.

It is a still further object of the invention to be able to either heat or cool a given area utilizing the same system and either heating or cooling the cooling and heat accumulation materials within a common chamber forming a part of a single system.

It is a still further object of the invention to provide a hot water supply system without necessitating the use of separate heating equipment for heating the water.

SUMMARY OF THE INVENTION

A cooling and heat accumulating type electric cooling and heating system embodying the invention includes a heating chamber in which is included a heater element, which heating chamber communicates with the bottom of a cooling and heat accumulating chamber. A cooling chamber communicates with the top of a cooling and heat accumulating chamber and has a cooling coil therein connected in circuit with a freezer unit. Plural valves and air ducts are connected to the cooling and heat accumulating chamber to facilitate the movement of air through the chamber in a desired air flow pattern to effect either heating or cooling depending upon the energy so stored within the chamber. Multiple convection suppressing layers are formed inside the chamber and have plural holes therein allowing communication therebetween. Heat and cold accumulating materials are provided between the convection suppressing layers and, when heated or cooled to a designated level, air so moving through the convection suppressing layers is allowed to move in intimate heat exchanging relation therewith to either heat or cool the air so passing therethrough. Air passing through such convection suppressing layers can either be via natural convection or by a forced air system.

BRIEF DESCRIPTION OF THE DRAWINGS

Other objects and purposes of the invention will be understood and more fully appreciated by reading the following detailed description and referring to the accompanying drawings, in which:

FIG. 2 is a schematic illustration of the device illustrated in FIG. 1 when in the heat accumulating mode;

FIG. 3 is a schematic illustration of the embodiment of FIG. 1 in the heating mode;

FIG. 4 is a schematic illustration of the embodiment of FIG. 1 in the cold accumulating mode;

FIG. 5 is a schematic illustration of the embodiment of FIG. 1 in the cooling mode;

DETAILED DESCRIPTION

Figure 1:
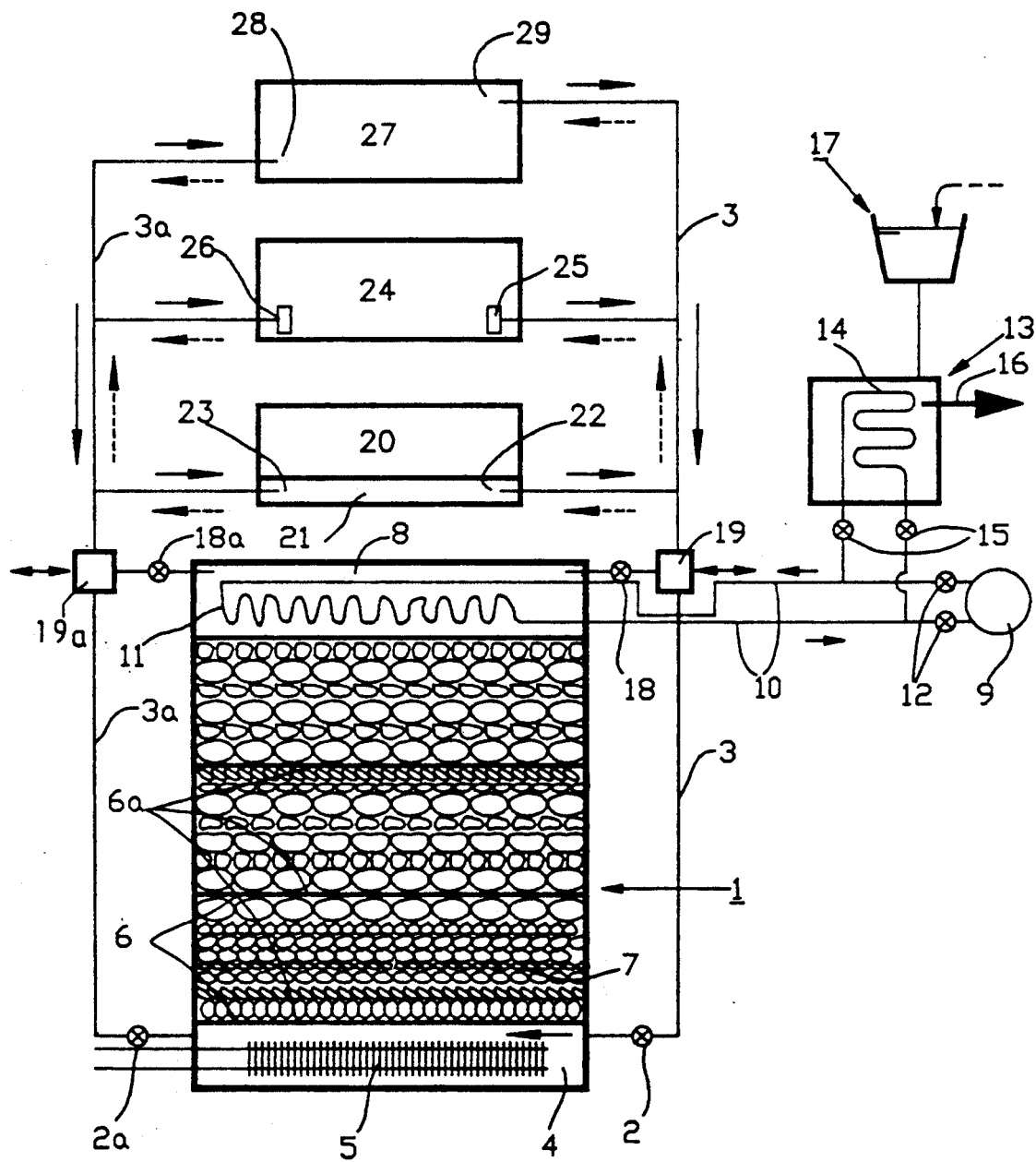
FIG. 1 is a schematic illustration of a first embodiment of the invention.

Referring to FIG. 1 of the drawings, a cooling and heat accumulating chamber 1 includes plural vertically spaced and separate convection suppressing layers 6. Plural openings or holes 6a connect the mutually adjacent layers 6 together. Solid cooling and heat accumulating materials 7 are contained in and fill the volume between each of the convection suppressing layers 6 of the chamber 1. Air is permitted to pass through the chamber 1 and each of the convection suppressing layers 6 past and in intimate contact with the solid materials 7 contained therebetween. A heating chamber 4 is provided at the bottom of the cooling and heat accumulating chamber 1 and has an electric heater element 5 therein. Similarly, a cooling chamber 8 is provided at the top of the cooling and heat accumulating chamber 1 and has a cooling coil 11 therein. Air feeding and recovery ducts 3 and 3a are connected to the heating chamber 4, preferably on opposite sides thereof so as to feed and remove air from the heating chamber 4. Air shut-off valves are series connected in each air duct, namely, the valve 2 in the duct 3 and the valve 2a in the duct 3a.

The cooling coil 11 is series connected between a pair of cooling pipes 10 that are connected in cooling medium carrying circuit with a freezer unit or machine 9. Shut-off valves 12 are connected in each pipe 10 adjacent the freezer unit. A hot water supply tank 13 includes a water tank 17 that supplies water to the tank 13. A heater coil 14 is provided inside the tank 13. The tank 13 also has a hot water supply line 16 leading therefrom. The pipes between which the heater coil 14 is connected are connected to a respective one of the cooling pipes 10 through shut-off valves 15. The hot water supply 13 is designed to be selectively operated by the freezer unit 9 or the heater coil 13.

The air ducts 3 and 3a extend to respective inlet and outlet openings in plural chambers 20, 24 and 27. Air mixers are series connected in the air ducts 3 and 3a, namely, the air mixer 19 is series connected in the air duct 3 and the air mixer 19a is series connected in the air duct 3a. A duct extends from each air mixer 19 and 19a into opposite sides of the cooling chamber 8 through a respective shut-off valve 18 and 18a.

When the circulating air of the heating chamber 4 or the cooling chamber 8 in the chamber 1 is very hot or very cold, an appropriate circulation circuit of cooling air communicating with the cooling chamber 8 or heating air communicating with the heating chamber 4 is formed through the feed and recovery ducts 3 and 3a which contain circulating air of the proper temperature. Air flows to and from the ventilating openings on both sides of a closed cavity heating system 21 in the chamber 20, the discharge and recovery openings 25 and 26 in the chamber 24 and the discharge hole 28 and recovery duct 29 in the chamber 27. Appropriate switching of the valves 2, 2a, 18 and 18a as well as controlling the air mixers 19 and 19a will facilitate appropriately temperatured air to move to the chambers 20, 24 and 27. If desired, conventional humidifying apparatus, dehumidifying apparatus, temperature sensing apparatus, noise prevention apparatus, air blowing apparatus, air cleaning apparatus and automatic control apparatus and the like may be arranged in the circuit and designed to maintain the air quality and temperature at the desired level. Further, the overall system can be used for heating and/or cooling and, therefore, the solid cooling and heat accumulating materials 7 are specifically adapted to accumulate heat as well as cold.

OPERATION (FIGS. 1-7)

The operation of the embodiment illustrated in FIGS. 1-7 will now be set forth in order to facilitate a better understanding of the invention.

Figure 6:
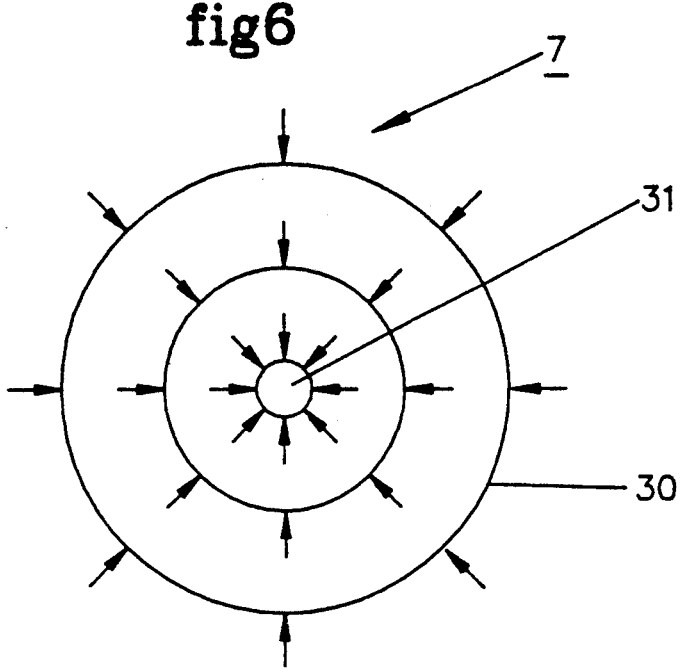
FIG. 6 schematically illustrates the heat transfer step during heat accumulation or cold accumulation.
Figure 7:
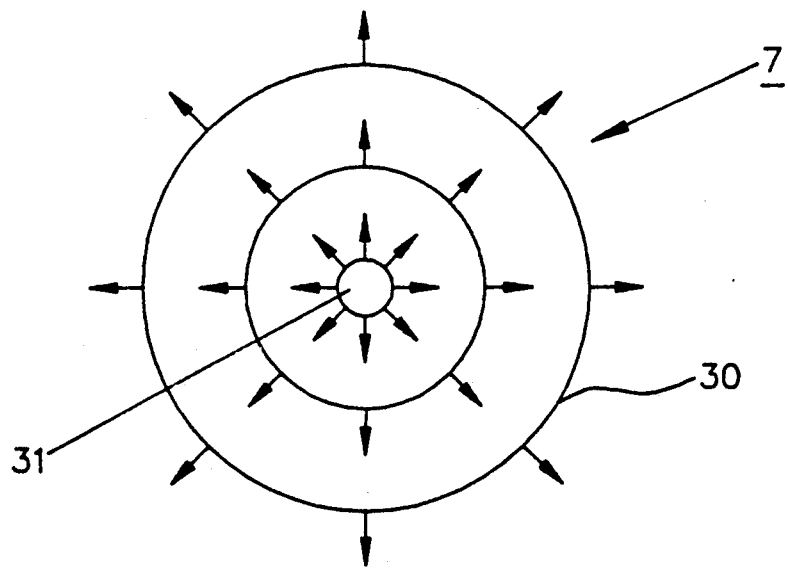
FIG. 7 schematically illustrates heat transfer when heating or cooling is taking place.

When it is desired to utilize the device as a heating apparatus, the valves 2, 2a, 18 and 18a and the shut-off valves 12 are closed. Further, the electric heating element 5 is activated to heat the air in the heating chamber 4. Heated air will rise in the chamber 1 into the convection suppressing layers 6 through the plural openings or holes 6a to heat the solid heat accumulating materials 7 contained between the convection suppressing layers 6. Accordingly, mixed convection currents occur in the volume between layers 6 as shown in FIG. 2, between each of the convection suppressing layers 6. Further, and as shown in FIG. 6, the outer layer 30 of the materials 7 are gradually heated and heat is gradually accumulated toward the center 31 of the materials. The materials 7 are, with the continued application of heat thereto, continuously heated during appropriately controlled times and preferably at times when the cost of electrical energy is reduced. Accumulated heat can occur to a temperature that is above 100° C. at the center 31 of the materials 7. Thus, the materials 7 may accumulate a substantial amount of heat energy which then can be used as a heat source by circulating air therepast.

For example, heated air can exit the chamber 1 through the valve 18 and the air mixer 19 into the duct 3. If the air is too hot, appropriate control can be provided by the air mixer to regulate the temperature of the air.

Air that is delivered to each of the chambers 20, 24 and 27 enter through respective openings 22, 25 and 29, respectively. Cooler air can be removed from the chambers through recovery openings 23, 26 and 28, respectively, which recovery openings are connected to the duct 3a for resubmission to the heating chamber 4. This cooler air will enter the heating chamber as shown schematically in FIG. 3 and, if the heating element 5 is then activated, heated and via convection moved upwardly to the volume between the convection suppressing layers 6 as described above. If the electrical heating element 5 is not activated, the cooled air will enter via convection the volume between the convection suppressing layers 6 anyway and pass intimately around the materials 7 to effect a heat exchange therewith so that the air becomes heated again for supply to the chambers 20, 24 and 27 as described above. With sufficient heat accumulation in the materials 7, sufficient heating for a long period of time can be accomplished with this apparatus.

Hot water can also be made available by passing a medium through the cooling coil 11 in the cooling chamber 8. This necessitates the shut-off valves 12 being closed and the valves 15 being opened. A circulation of medium through the cooling coil 11 will result in the coil 14 being eventually heated to a sufficient level to heat the water in the hot water supply tank 13, thereby making hot water available through the supply line 16. As water is removed from the tank 13 through the supply line 16, the tank 13 is replenished by water from the tank 17.

When it is desired to effect a cooling of the chambers 20, 24 and 27, the electrical heating element 5 is disabled and the valves 12 are opened and the valves 2, 2a, 18, 18a and 15 are closed. In addition, the freezer unit is activated to move the medium through the cooling coil 11 in the cooling chamber 8. As the cooling coil 11 becomes cooled by the coolant passing therethrough, air inside the cooling chamber will be cooled and will drop into the volume between the suppressing layers 6 to effect a cooling of the materials 7 from the outside layer 30 toward the center 31 of the chamber 1. The convection current phenomena formed between the chamber 8 and the heating chamber 4 is shown in FIG. 4. The center 31 of the materials 7 is cooled to a temperature of minus 200° C. As a result, a substantial amount of cold energy is contained within a rather small volume.

When it is desired to effect a cooling of the chambers 20, 24 and 27, the valves 2 and 18a are opened to allow air to move via natural convection or via a forced circulation circuit but in the reverse order, namely, from the top of the chamber 1 toward the bottom thereof as shown in FIG. 5. FIG. 3 shows the air movement during a heating mode. Heated air is returned to the cooling chamber 8 through the duct 3a and valve 18a and is allowed to move in close intimate relation with the cold materials 7 to effect a heat exchange therewith and become cooled again for exit from the chamber 1 through the valve 2, air duct 3 and back into the respective chambers 20, 24 and 27.

ALTERNATE EMBODIMENT

(FIGS. 8-10)

Figure 8:
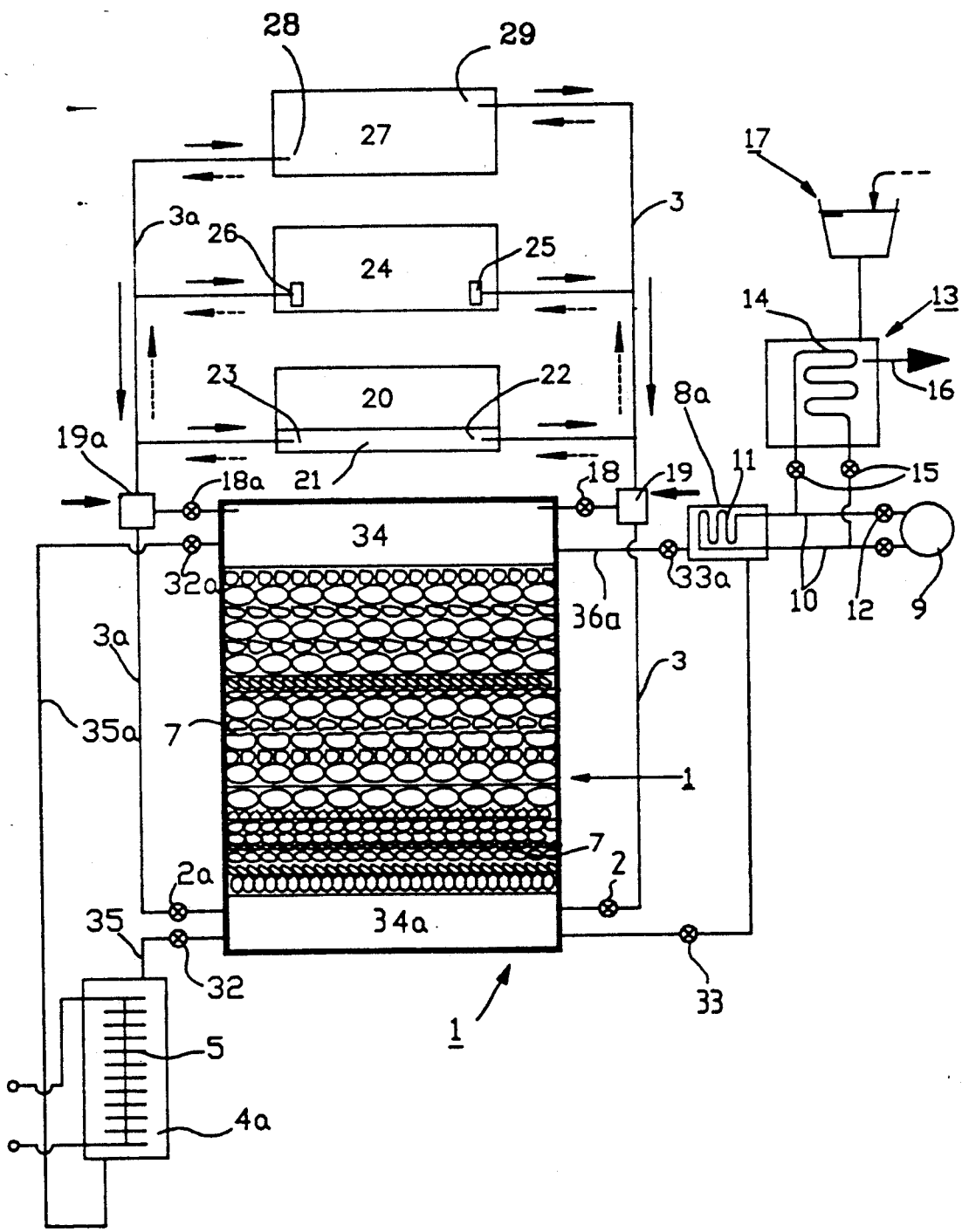
FIG. 8 is a schematic illustration of an alternate embodiment embodying the invention.
Figure 9:
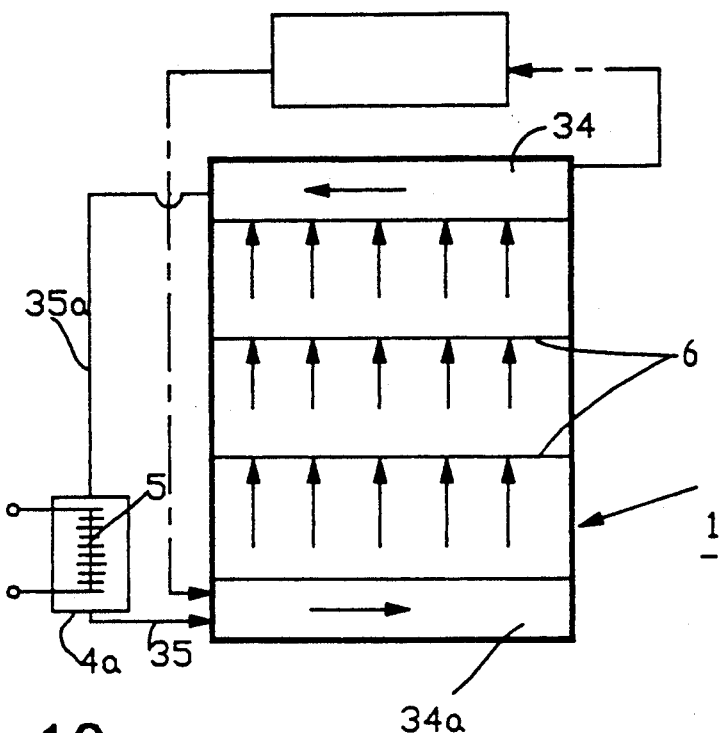
FIG. 9 is a schematic illustration of the embodiment in FIG. 8 when in the heat accumulating/heating mode.
Figure 10:
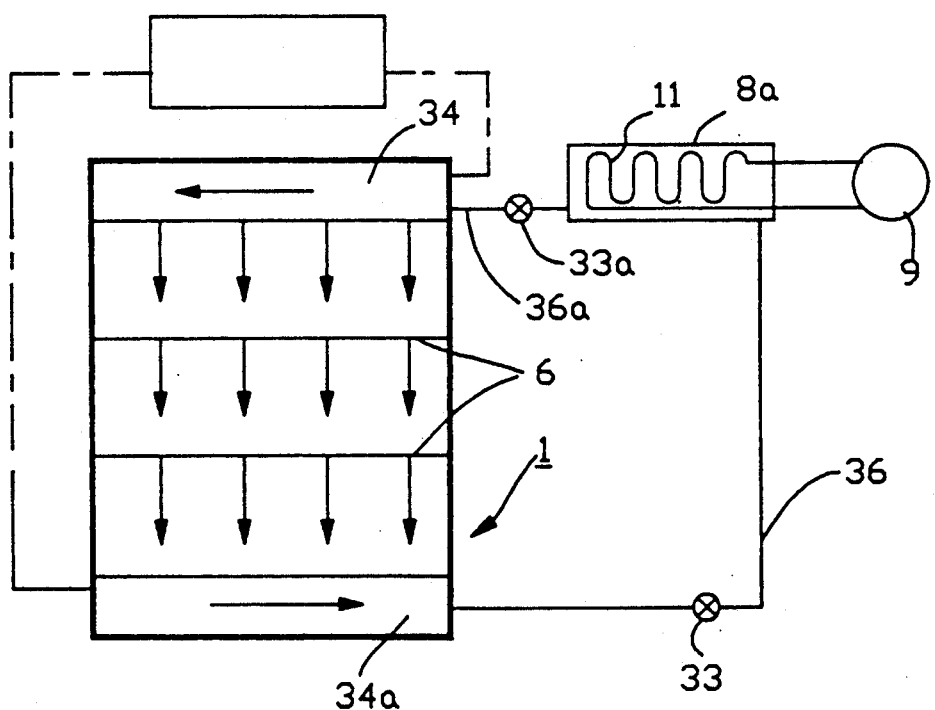
FIG. 10 is a schematic illustration of the embodiment of FIG. 8 in the cold accumulating/cooling mode.

FIGS. 8 to 10 illustrate another embodiment of the invention. Identical or similar structure to that described above will be described below utilizing the same reference numerals as those that were utilized in the description of FIGS. 1-7.

The heating element 5 in this particular embodiment is located in a separate chamber 4a that is outside the heating chamber 34a at the bottom of the chamber 1 and, similarly, the cooling chamber 8a is located outside the cooling chamber 34 at the top of the chamber 1. However, in all other respects, the respective heating chamber 4a and cooling chamber 8a are heated and cooled by the respective electric heating element 5 and cooling coil 11 except that air ducts supply air to and remove air from those elements and deliver them to the respective chambers 34a and 34. More specifically, the heating chamber 4a is separate from the chamber 1 and houses within it the electric heater element 5. The chamber 4a is connected to the lowermost chamber 34a of the chamber 1 through an air duct 35 and series connected shut-off valve 32. The chamber 4a is also connected via an air duct 35a to the uppermost chamber 34 of the chamber 1 through a shut-off valve 32a. Similarly, the cooling chamber 8a is separate from the upper chamber 34 of the chamber 1. The chamber 8a is connected to the uppermost chamber 34 through an air duct 36a and shut-off valve 33a. The chamber 8a is also connected via another air duct and valve 33 to the lowermost chamber 34a of the chamber 1. Other than this circuitry, the embodiment of FIGS. 8-10 is identical to the embodiment of FIGS. 1-7.

OPERATION

(FIGS. 8-10)

In the heat accumulating mode, the valves 2, 2a, 18, 18a and the cooling shut-off valves 12 are closed. Further, the switching valves 32, 32a arranged on the ducts 35 and 35a are open. As a result, the electric heater element 5, when activated, will heat the air within the chamber 1 and air will flow in a continuous circuit into the lowermost chamber 34a, up through the convection suppressing layers 6 and out through the uppermost chamber 34 and back through the duct 35a to the heater element 5. After a sufficient amount of heat has been accumulated in the chamber 1, and when it is desired to have hot water, the valves 12 are closed and the valves 15 are opened as described above. In addition, the valves 33a and 33 are opened to allow heated air to move out of the chamber 34 through the duct 36a into the chamber 8a to move in heat exchanged relation with the coil 11 and thence return to the chamber 1, particularly the lowermost chamber 34a thereof through the valve 33. The medium in the cooling coil 11 will become heated and moved to the coil 14 to heat the water in the hot water supply tank 13 as aforesaid.

Throughout this heat accumulating process, it is desired to operate the heating element 5 during periods of time that the cost of energy is the least expensive. This is usually during the nighttime hours. Sufficient heat will be stored by the materials 7 between the convection suppressing layers 6 to facilitate heating for a prolonged period of time without necessarily reactivating the heating element 5.

When it is desired to effect a cold accumulating process, the valves 2, 2a, 18, 18a, 32, 32a and the valves 15 are closed. The valves 33, 33a and the shutoff valves 12 are open and the freezer unit is activated. Accordingly, air contacting the cooling coil 11 in the cooling chamber 8a is cooled by the coolant circulating through the coil 11. The cooled air is allowed to enter the top chamber 34 and percolate down through the convection suppressing layers 6 to cool the materials 7 as aforesaid. At the completion of the accumulation of coldness in the materials 7, the valves 2 and 18a are opened and air is allowed to circulate to the chambers 20, 24 and 27 as aforesaid. As the air becomes heated in each of the chambers 20, 24 and 27, heated air is returned to the chamber 1 via the valve 18a where it is moved into close intimate heat exchange relation with the materials 7 inside the chamber 1 to become cooled again and recirculated to the respective chambers 20, 24 and 27 as aforesaid.

The embodiments described herein are very simple and are inexpensive to maintain, manufacture and operate. Further, the space occupied by the equipment is very little, which means that the equipment can be conveniently located in even the smallest of residences and buildings.

Further, the range of temperatures that heat can be accumulated as well as coldness can be accumulated is from minus 200° C. to 1000° C. As a result, proper temperatures can be maintained in chambers 20, 24 and 27 for a prolonged period of time before it is necessary to rejuvenate the chamber 1 with heat energy or cold energy. Through the use of nighttime generated electric power, appropriate cold accumulation as well as heat accumulation can occur with a minimum of expense and at an optimum of safety. Further, the use of a noncombustible heat source results in no on-site environmental pollution, noise and the like.

If desired, the freezer unit can be converted into a heating system and utilized as a separate hot water supply.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A cooling and heat accumulating type electric cooling and heating system, comprising:
   a heating chamber in which is disposed a heater element, said heating chamber being connected in air flow circuit with the bottom part of a cooling and heat accumulating chamber;
   plural switching valves and feed and recovery ducts connected in air flow circuit with said cooling and heat accumulating chamber and volumes that are to be heated or cooled;
   multiple convection suppressing layers in said cooling and heat accumulating chamber, the space between mutually adjacent ones of which are connected by a plurality of holes;
   solid cooling and heat accumulating materials filling said space between said layers; and
   a cooling chamber in which is disposed a cooling coil connected in air flow circuit with the top part of said cooling and heat accumulating chamber, and heating cut-off valves connected to a hot water supply heater and cooling cut-off valves connected to a freezing machine to enable alternate circulation through cooling pipes, said cooling chamber being connected to air mixers and communicated with said feed and recovery duct to thereby form a circulation circuit.

2. The cooling and heat accumulating type electric cooling and heating system as claimed in claim 1, wherein a heat exchange of air with said solid cooling and heat accumulating materials is utilized to enable a formation of a cooling reserve and cooling radiation or a heat reserve and heat radiation by downward cooling or upward heating air movements through said cooling and heat accumulating chamber.

3. The cooling and heat accumulating type electric cooling and heating system as claimed in claim 1, wherein said circulation circuit is capable of natural or forced circulation of air reversibly through said cooling and heat accumulating chamber.

4. The cooling and heat accumulating type electric cooling and heating system as claimed in claim 1, wherein said solid cooling and heat accumulating material serves to enable cooling or heating under cooling or heat radiation when said materials are cooled to accumulate cooling or heated to accumulate heat, for a fixed time when the cooling or heat accumulation material is not used as cooling or heating medium.

5. The cooling and heat accumulating type electric cooling and heating system as claimed in claim 1, wherein said heating chamber and said cooling chamber are both located outside of said cooling and heat accumulating chamber and include means for communicating with said ducts and said switching valves to form said circulation circuit.

6. A method for effecting a cooling or a heating with a cooling and heat accumulating type electric cooling and heating system, in which a heating chamber is connected in air flow circuit with the bottom part of a cooling and heat accumulating chamber, and using plural switching valves and feed and recovery ducts, said system further including multiple convection current suppressing layers in said cooling and heat accumulating chamber, the space between mutually adjacent ones of which are connected by a plurality of holes and solid cooling and heat accumulating materials fills said space between the layers; a cooling coil and cooling cut-off valves connected to a freezing machine connected in air flow circuit with the top part of the cooling and heat accumulating chamber, the cooling chamber being connected to air mixers and communicated with the feed and recovery ducts to thereby form a circulation circuit, comprising the steps of; closing the switching valves and cut-off valves when heat is being accumulated and convection current is partially taking place in said heating chamber when heated by a heater, another part of the convection current being raised upward through the holes in the convection current suppressing layers within the cooling and heat accumulating chamber filled with the cooling and heat accumulating materials; opening selected switching valves to allow the heated air to pass through feed and recovery ducts through said switching valves and air mixers; and delivering the heated air to a desired volume through a delivery ventilation hole, removed therefrom through an air recovery hole and a duct in each desired volume and passing through the feed and recovery duct, and then the cooled air is allowed to circulate through the heating chamber through a feed and recovery duct, an air mixer and a switching valve.

7. The method according to claim 6, wherein said materials are heated and heat accumulated therein at heating times and at a fixed heating hour to a high temperature of above 100° C. to the center of the material; and when said system is in a heating mode, natural or forced circulation of air in intimate contact with the material occurs.

8. The method according to claim 6, wherein cooled air from the desired area is placed into heat exchange relation with the accumulated heat of said material from the center to the outer layer to cause the air in the cooling and heat accumulating chamber to be heated again.

9. The method according to claim 6, wherein in a hot water supply mode, the cooling cut-off valves of a cooling medium circulation system which communicates with the cooling coil in the cooling chamber and the cooling pipes of the freezing machine are closed and the heating cut-off valves are opened.

* * * * *